Jan. 5, 1960  R. W. BROWN  2,919,615
END-FACING ATTACHMENT FOR METAL TURNING MACHINES
Filed Sept. 7, 1956  2 Sheets-Sheet 1
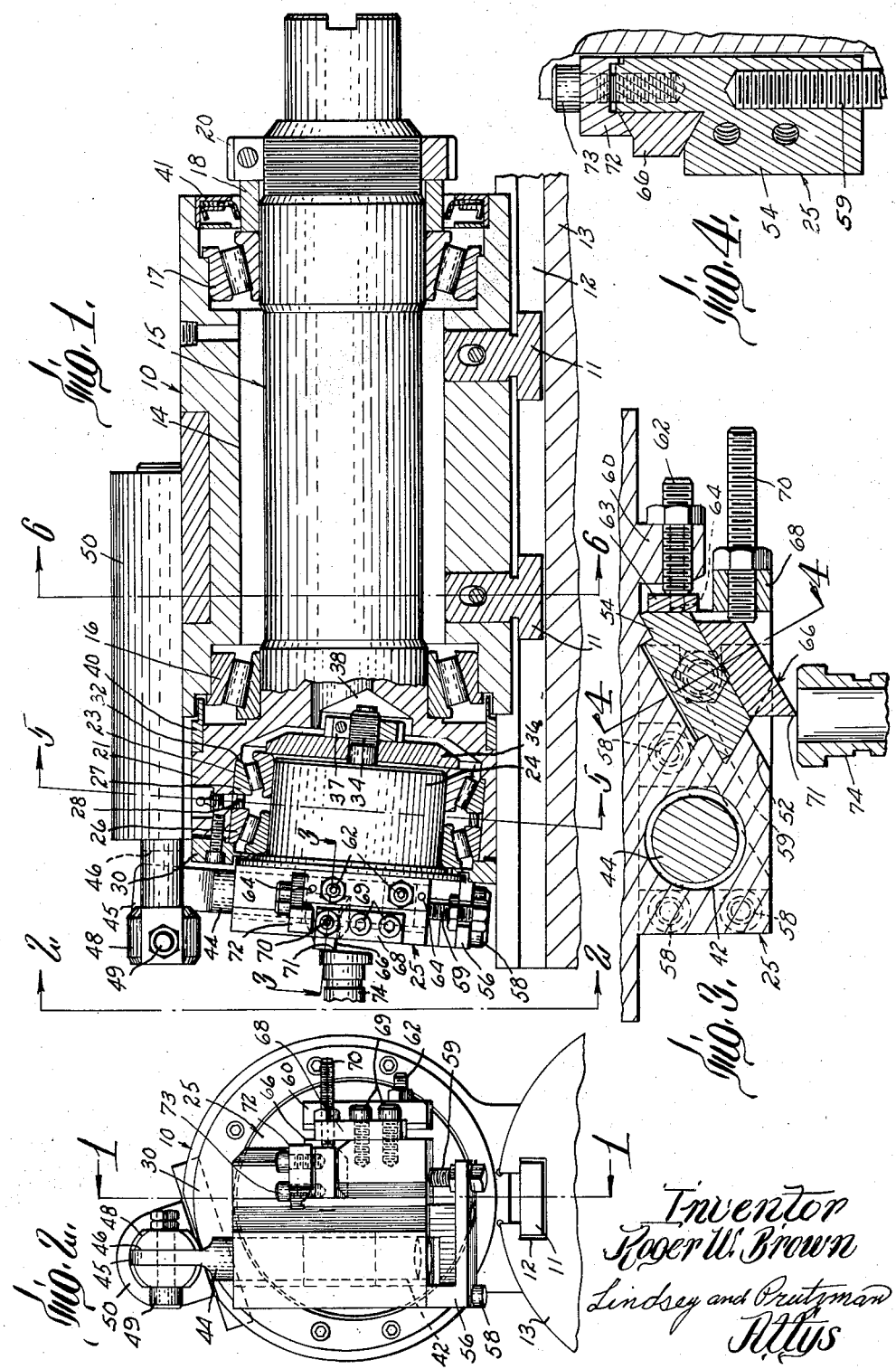
Inventor
Roger W. Brown
Lindsey and Prutzman
Attys Jan. 5, 1960 R. W. BROWN 2,919,615
END-FACING ATTACHMENT FOR METAL TURNING MACHINES
Filed Sept. 7, 1956 2 Sheets-Sheet 2
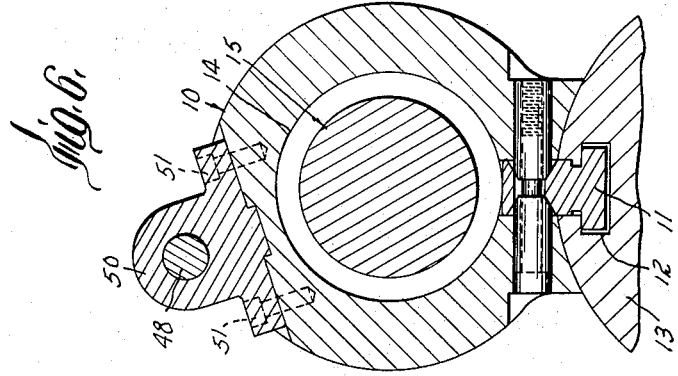
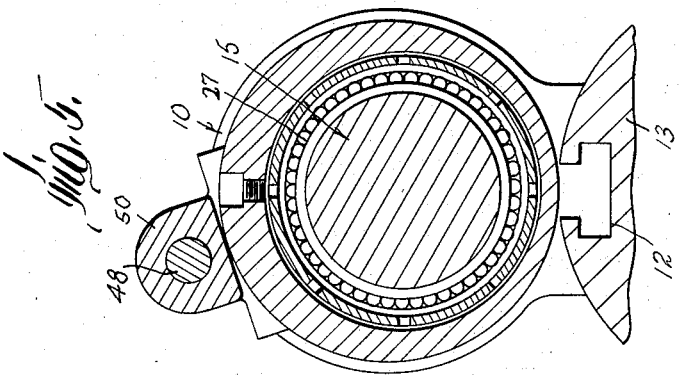
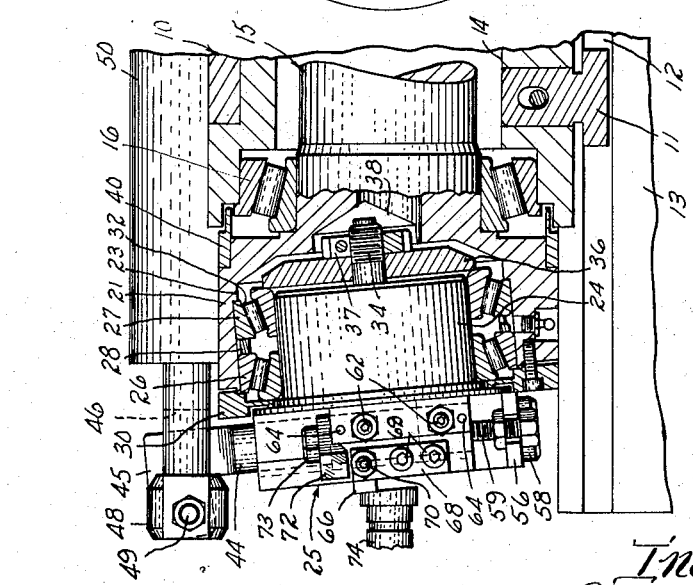
Inventor
Roger W. Brown
Lindsey and Pretzman
Attys

United States Patent Office 2,919,615
Patented Jan. 5, 1960

2,919,615

END-FACING ATTACHMENT FOR METAL TURNING MACHINES

Roger W. Brown, Windsor, Vt., assignor to Cone Automatic Machine Company, Inc., Windsor, Vt., a corporation of Vermont Application September 7, 1956, Serial No. 608,463

4 Claims. (Cl. 82—11)

This invention relates to a novel and improved attachment for a metal turning machine for use in angularly end-facing a workpiece.

It is the object of this invention to provide a novel and improved end-facing attachment for use with a turning machine such as a lathe, whereby the end of a workpiece may be automatically and accurately faced at a predetermined angle to the axis of the workpiece.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Fig. 1 is a side elevational view of an end-facing attachment constructed in accordance with the invention with a portion of the tool in section along the line 1—1 of Fig. 2;

Fig. 2 is an end view of the attachment of Fig. 1 taken in the direction of the line 2—2 of Fig. 1;

Fig. 3 is an enlarged fragmentary cross section of Fig. 1 along the line 3—3 thereof;

Fig. 4 is a cross sectional view taken along the line 4—4 of Fig. 3;

Fig. 5 is a cross sectional view taken along the line 5—5 of Fig. 1;

Fig. 6 is a cross sectional view taken along the line 6—6 of Fig. 1; and

Fig. 7 is a fragmentary side elevational view of the attachment of Fig. 1 showing a portion of the tool in a different operative position.

With reference to the drawings wherein is shown an end-facing attachment constructed in accordance with the invention, the tool in comprised of a main support member, frame or housing 10 adapted to be mounted by T-bolts 11 in a T-slot 12 extending longitudinally of a turret 13 of an automatic metal turning machine. The housing 10 is provided with a throughbore 14 in which is coaxially disposed a drive shaft 15 journaled in bearings 16 and 17 located adjacent either end of the housing. The shaft is secured against end-wise play by means of a sleeve 18 surrounding the shaft adjacent the rightward end thereof as shown in Fig. 1. One end of the sleeve 18 engages the inner race of the bearing 17 and the other end of the sleeve is engaged by a split nut 20 threadably received on the rightward end of the drive shaft 15.

In accordance with the invention, the drive shaft 15 is provided with a coaxial enlarged portion 21, the free end of which is preferably angularly faced at the predetermined angle at which it is desired to face the end of a workpiece. A recess 23 is provided in the enlarged portion 21 extending from the free end thereof with its axis normal to the angularly faced free end of the enlarged portion 21. As is most clearly seen in Fig. 2 the recess 23, is eccentrically disposed relative to the shaft 15, and the cylindrical shank 24 of a toolholder 25 is coaxially journaled within the recess 23 by means of bearings 26 and 27. A spacer sleeve 28 maintains the bearings 26 and 27 properly spaced apart and an end cover plate 30 mounted on the housing 10 prevents displacement of the bearings 26 and 27 in one direction while a shoulder 32 on the periphery of the recess 23 prevents displacement of the bearings 26, 27 in the other direction. The shank 24 of the toolholder is provided with a threaded coaxial extension 34 on which is mounted a washer 36 and a split nut 37 to maintain the toolholder and bearings in assembled relation. As can be seen in Fig. 1, a recess 38 is provided in the housing 10 to accommodate the split nut 37. A sleeve 40 is disposed between the housing 10 and toolholder 25 adjacent the outer peripheries thereof to prevent foreign matter from reaching the bearings 16 and 17, and for a similar reason, peripheral sealing means are provided at the other end of the housing as at 41.

In accordance with the invention, the body of the toolholder is provided with a circular aperture 42 having its longitudinal axis lying parallel to the diametrical plane of the shank 24 of the toolholder 25. Slidably and rotatably received within a pair of spaced apart bearings disposed in the aperture 24 is a cylindrical supporting rod 44. One end of the supporting rod 44 extends outwardly of the aperture 42, as shown in Figs. 1, 2 and 7, and is reduced in thickness as at 45 for reception within a slot 46 extending longitudinally from one end of a cylindrical control rod 48. The rods 44 and 48 are pivotally connected as at 49 and the rod 48 is slidably and rotatably received within a housing or bracket 50 secured to the main housing 10 as shown in Fig. 6 by means such as bolts 51.

With particular reference to Figs. 1–4, the free end of the toolholder 25 is angularly relieved as at 52 to form an inclined surface extending rearwardly and axially thereof. As most clearly shown in Figs. 3 and 4 a toolholder slide 54 is slidably mounted on the toolholder for movement parallel to the axis of the supporting rod 44 within a plane parallel to the inclined surface 52. A vertical adjusting plate 56 is mounted on the bottom of the toolholder 25 by bolts 58, and an adjusting bolt 59 is carried by the plate 56 in engagement with the bottom of the toolholder slide 54 for the vertical adjustment of the slide. A flange 60 is provided on the front end toolholder 25 extending parallel to the axis of the toolholder slide 54 and carries a pair of screws 62 which clampingly engage a plate 63 with one longitudinal edge of the toolholder slide 54 to retain the slide in assembly with the toolholder. The clamping plate 63 is loosely supported on the flange 60 by means of a pair of pins 64 which in the specific embodiment are of the hollow spring type and are pressed into the flange 60.

As most clearly seen in Figs. 3 and 4, a cutting tool bit 66 is slidably mounted on the toolholder slide 54 for movement transversely of the longitudinal axis of the toolholder slide 54 within a plane parallel to the inclined surface 52 of the toolholder. A tool bit stop block 68 is mounted, as shown in Fig. 2, on one side of the toolholder slide 54 by bolts 69 and carries an adjusting screw 70 engageable with one longitudinal edge of the tool bit 66 to adjust the position of the tool bit in the slide 54. As can be seen in Figs. 1 and 3, the cutting edge 71 of the tool bit, for a reason which will be hereinafter apparent, is disposed parallel to the longitudinal axis of the supporting rod 44 and radially of the toolholder shank 24. A tool bit clamping plate 72, as shown in Fig. 4, is mounted on the tool slide 54 by bolts 73 and clampingly secures the tool bit 66 in the desired position.

In the operation of an end-facing attachment constructed in accordance with the invention, the axis of the drive shaft 15 is aligned with the axis of the workpiece 74 and the drive shaft is rotated by suitable means at a speed which is synchronous with the speed of rotation of the workpiece 74. Inasmuch as the toolholder 25 is prevented from rotating with the drive shaft by the rods 44 and 48, the toolholder will, upon rotation of the drive shaft, be progressively tilted around the axis of the drive shaft in synchronism with the rotation of the workpiece 74; this tilting movement being comprised of pivotal movement of the toolholder about the axis of the rod 44 and tilting movement with the rod 44. Simultaneously with this tilting movement the axis of shank 24, because of the eccentric mounting of the shank, orbits about the axis of shaft 15 to describe a cone, the apex of which lies on the center of the face of workpiece 74. While shank 24 does not orbit, bearings 26 and 27 do orbit in respect to the shank, since they rotate around it during operation of the device. Rod 44, interconnected between the tool holder and control rod 48, limits position of the tool holder relative to shaft 15 during the resulting wobbling of the tool holder as the axis of shank 24 orbits about the axis of shaft 15. Rod 44, in cooperation with rod 48, thus limits movement of the tool holder relative to shaft 15 to a predetermined oscillation of the tool holder about its rotational axis. It should here be noted that the relative disposition of the rotational axes of the toolholder shank 24 and the drive shaft 15 should preferably be such that the axes converge at a point spaced forwardly of the toolholder 25. This will permit the tool bit 66 to be positioned so that a projection of its cutting edge 71 will pass through the converging point of the axes, which is necessary in order for the tool to cut true.

The integrated wobbling and oscillation of the toolholder, of course, results in a corresponding movement of the tool bit 66. With the cutting edge 71 of the tool bit disposed as described above, the cutting edge will be moved with the tool holder in synchronism with the rotation of the workpiece so as always to be in the proper cutting relationship with the workpiece to face the portion of the end thereof engageable by the tool bit at the predetermined angle of the axis of the toolholder shank 24 to the axis of the drive shaft 15.

During use of the attachment to end face a workpiece, as described, the initial engagement of the tool bit with the workpiece will make a generally chordwise cut on the end of the workpiece at the desired predetermined angle to the axis of the workpiece. As the work is fed toward the tool the tool will take cuts of progressively larger area until the end of the workpiece is entirely faced at said predetermined angle.

Thus it can be seen that there has been provided a novel and improved attachment for end facing a workpiece at a predetermined angle, which is particularly suitable for use with automatic metal turning machines. The tool is adapted to be easily set up or removed from a machine with a minimum of time and effort and is of a construction which will assure a long and trouble-free service life.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:
1. An end-facing attachment for a metal turning machine, comprising a frame, a rotatable member journalled on the frame and adapted to be rotated in synchronism with a workpiece, said member having an eccentrically disposed recess in one end thereof with the axis of said recess intersecting the rotational axis of said member, a tool holder journalled in said recess coaxial therewith, and restraining means connecting the tool holder to the frame, said restraining means preventing rotation of said tool holder relative to said frame thereby to control the oscillated position of the tool holder relative to the rotatable member during rotation of said rotatable member.

2. An end-facing attachment for a metal turning machine, comprising a frame, a rotatable member journalled on the frame and adapted to be rotated in synchronism with a workpiece, a tool holder having a shank eccentrically journalled on said member with the shank axis inclined to and intersecting the axis of said rotatable member at a point spaced from said tool holder, and means connecting the tool holder to the frame to limit oscillation of the tool holder relative to the rotatable member to provide an integrated wobbling of the tool holder in response to rotation of said rotatable member.

3. An end-facing attachment for a metal turning machine, comprising a frame, a rotatable member journalled on the frame and adapted to be rotated in synchronism with a workpiece, a tool holder eccentrically journalled on said member with the rotational axes of said tool holder and member disposed at an incline to intersect at a point spaced from said tool holder and member on the projected axis of said member, a cutting tool having a straight cutting edge supported on said tool holder with the cutting edge thereof extending radially of the rotational axis of said tool holder and lying in a plane which is parallel to the plane of rotation of said tool holder and which passes through the intersection of said rotational axes, and means on the frame connecting the toolholder to control oscillation and wobbling thereof relative to the rotatable member during rotation of said rotatable member.

4. An end-facing attachment for a metal turning machine, comprising a frame, a rotatable member journalled on the frame and adapted to be rotated in synchronism with a workpiece, a toolholder eccentrically journalled on one end of said member with the axis of said toolholder extending at a predetermined angle of inclination to the rotational axis of said member, a first cylindrical rod slidably mounted at one end on said toolholder, a second cylindrical rod slidably and rotatably mounted on said frame along an axis parallel to said rotatable member, and means pivotally connecting said first and second rods to control the oscillated position of said toolholder relative to said rotatable member during rotation of said rotatable member.

References Cited in the file of this patent

UNITED STATES PATENTS

| | | |
|---|---|---|
| 499,977 | Fellows | June 20, 1893 |
| 1,148,065 | Warren | July 27, 1915 |
| 1,805,964 | Wallis | May 19, 1931 |
| 2,039,646 | Hoisington | May 5, 1936 |
| 2,121,934 | Sander | June 28, 1938 |
| 2,491,624 | Shaff | Dec. 20, 1949 |
| 2,577,675 | Burkland | Dec. 4, 1951 |
| 2,670,525 | Miller | Mar. 2, 1954 |

FOREIGN PATENTS

| | | |
|---|---|---|
| 629,081 | Great Britain | Sept. 9, 1949 |